United States Patent [19]

Riegler

[11] 4,366,271

[45] Dec. 28, 1982

[54] PROCESS FOR THE PRODUCTION OF COLORANT PREPARATIONS AND THE COLORANT PREPARATIONS OBTAINED THEREBY

[75] Inventor: Albert Riegler, Basel, Switzerland

[73] Assignee: Ciba-Geigy Corporation, Ardsley, N.Y.

[21] Appl. No.: 266,790

[22] Filed: May 26, 1981

Related U.S. Application Data

[63] Continuation-in-part of Ser. No. 99,953, Dec. 3, 1979, abandoned.

[30] Foreign Application Priority Data

Dec. 7, 1978 [CH] Switzerland ................ 12520/78

[51] Int. Cl.$^3$ .............................................. B01J 2/10
[52] U.S. Cl. ...................................... 523/333; 264/5; 264/140; 264/157
[58] Field of Search ................. 264/5, 140, 157; 523/333

[56] References Cited

U.S. PATENT DOCUMENTS

| | | |
|---|---|---|
| 2,755,195 | 7/1956 | Grubenmann . |
| 3,308,211 | 3/1967 | Plastridge .............................. 264/5 |
| 3,582,384 | 6/1971 | Belde et al. . |
| 4,116,924 | 9/1978 | Peabody . |

FOREIGN PATENT DOCUMENTS

| | | |
|---|---|---|
| 233699 | 5/1964 | Austria . |
| 1155550 | 6/1969 | United Kingdom . |
| 1263943 | 2/1972 | United Kingdom . |
| 1313582 | 4/1973 | United Kingdom . |
| 1323086 | 7/1973 | United Kingdom . |
| 1458418 | 12/1976 | United Kingdom . |
| 1542369 | 4/1979 | United Kingdom . |

OTHER PUBLICATIONS

Hans Kittel, Pigmente, Wissenschaftliche Verlag, Stuttgart, 1960, pp. 569-578.

*Primary Examiner*—James R. Hall
*Attorney, Agent, or Firm*—Luther A. R. Hall

[57] ABSTRACT

An improved flush process for the production of a colorant composition, which involves mixing a colorant in the presence of water with the organic carrier material in a kneader at a temperature sufficient to melt said organic carrier material and flushing the colorant onto the organic carrier material with the concomitant formation of a colorant-free separate water phase, wherein the improvement consists essentially of kneading the mixture of molten colorant composition and separate colorant-free water while cooling the kneader and the mixture to a temperature below the softening point of the organic carrier, a temperature sufficient to cause the molten colorant composition to solidify, and concomitantly comminuting the solidified colorant composition into broken, irregular granulates in the presence of the colorant-free water.

9 Claims, No Drawings

PROCESS FOR THE PRODUCTION OF COLORANT PREPARATIONS AND THE COLORANT PREPARATIONS OBTAINED THEREBY

This application is a continuation-in-part of application Ser. No. 99,953, filed Dec. 3, 1979, now abandoned.

It is known to convert pigments into preparations by flushing. In this process, which is usually carried out in a kneader, an aqueous pigment paste is mixed with a water-repellent carrier until the pigment is converted from the aqueous phase to the organic phase of the carrier. The pigment-free water is then separated and the pigment-containing carrier is processed.

As water-repellent carriers there are usually employed organic solvents and plasticisers or organic solutions or melts of resins and plastics materials.

Swiss Pat. No. 482 812 describes a process for obtaining a dry pigment preparation by incorporating a pigment, without the concurrent use of solvents, in a carrier of a polymer of vinyl chloride, vinyl acetate and dicarboxylic acid, and a polymer of vinyl chloride and vinyl acetate, in the temperature range between about 110° and 160° C., in a kneader or roll mill. After homogenising the pigment in the carrier, the composition is cooled and the solidified material is crushed, for which a considerable expenditure of energy is necessary.

In the process of Swiss Pat. No. 522 025, which relates to the action of shear stress on a mixture of aqueous pigment filter cake, polyethylene and a fatty acid amide, at 80° to 95° C. up to removal of the water by evaporation, the melt is cooled and the solidified mass is crushed before being granulated.

The present invention provides a process for the production of a colorant preparation by incorporating the colorant in the melt of an organic polymer or monomer, which process comprises heating the colorant in a kneader, with the organic material to the melt temperature of the latter, and allowing the melt, in the presence of water and with the kneader in operation, to cool and solidify while comminuting it. Organic monomers can also be employed in the process, e.g. solid plasticisers belonging to the class of the benzoic acid derivatives. However, it is preferred to employ an organic polymer, as the technical advantage—low energy consumption for cooling the melt in the kneader—is of particular importance.

More particulaly the invention provides an improved flush process for the production of a colorant composition, which contains, by weight of the total composition, 10 to 90% of a water-insoluble colorant and 90 to 10% of a water-repellant organic carrier material, which involves mixing a colorant in the presence of water with the organic carrier material, which material has a softening point between 60° and 100° C., in a kneader at a temperature sufficient to melt said organic carrier material and flushing the colorant onto the organic carrier material with the concomitant formation of a colorant-free separate water phase, wherein the improvement consists essentially of kneading the mixture of molten colorant composition and separate colorant-free water while cooling the kneader and the mixture to a temperature below the softening point of the organic carrier, a temperature sufficient to cause the molten colorant composition to solidify, and concomitantly comminuting the solidified colorant composition into broken, irregular granulates in the presence of the colorant-free water.

In this process, it is advantageous to heat an aqueous pigment paste with the organic carrier material, preferably a resin, to the melt temperature of this latter, and to allow the melt, after conversion of the pigment from the aqueous to the organic phase, to cool and congeal in the kneader and simultaneously to comminute the melt while the kneader is in operation.

If desired, it is possible to use a colorant in dry form. In this case, water is added to the melt of the carrier resin before or after addition of the dry colorant. The cooling and granulating process can be accelerated, if desired, by addition of ice. It is also possible, however, first to make the dry colorant into a paste with water. This can be advantageous if, for example, the colorant employed is carbon black. By comminuting the melt in the presence of water, the kneader requires substantially less energy and the resultant granulates can, moreover, be simply and effortlessly discharged from the machine and processed.

As carrier resin it is preferred to use an organic polymer with a softening point in the range between 60° and 100° C., especially between 75° and 90° C. In principle, all water-repellant thermoplastic resins and plastics materials of the most varied chemical classes are suitable, in particular all hydrocarbon resins, e.g. petroresins, aromatic, aliphatic, alkylaromatic and cycloaliphatic hydrocarbon resins, polyisobutylene, polybutylenes, polybutadienes and polypentadienes. Excellent carrier resins are e.g. polyethylene waxes and polypropylene waxes, and oxazoline waxes, and polyacrylic resins, and especially ethylene/vinyl acetate copolymers, preferably those containing 5 to 45% by weight, especially 5 to 30% by weight, of vinyl acetate. The ethylene/vinyl acetate copolymers can also be used in admixture with other substances, for example with polyolefin wax and/or metal soap.

It is also possible to use resins which melt at temperatures above 100° C. if the process is carried out in a pressure-resistant kneader, for example of the Banbury type. Finally, the melting range can also be influenced by mixing different carrier materials, such that components which melt at temperatures above 100° C. can also be processed in admixture with other components in conventional kneaders if the mixture has the requisite low melting range.

The content of colorant in the preparations obtained according to the invention is between 10 and 90% by weight, preferably between 30 and 70% by weight.

In contrast to the known melt-kneading and melt-flush processes, in which the dried and solidified melt has to be crushed, the process of the present invention, wherein the melt is cooled in the machine while this latter is still in operation, and in the presence of water, makes it possible to carry out such procedures without being dependent on heavy machines. This means, inter alia, a reduction in investment, service and maintenance costs and a saving of energy. As colorants it is possible to use all water-insoluble pigments and polymer-soluble colourants, and also water-insoluble fillers and additives, e.g. fluorescent whitening agents of pigment character.

In particular, organic and inorganic pigments in the form of the dry powders or, preferably, moist filter cakes, which are obtained in synthesis and/or after conditioning or grinding, are suitable for the process of the invention.

Examples of suitable inorganic pigments are: titanium dioxide, iron oxides, chromium oxides and chromate pigments such as chromium oxide green and lead chromate yellow and lead chromate red, molybdate orange, cadmium sulfides and cadmium sulfoselenides, ultramarines, and nickel titanate yellow. As organic pigments it is possible to use carbon blacks, azo, methine, azomethine, phthalocyanine, nitro, anthraquinone, perinone, perylenetetracarboxylic acid derivative, dioxazine, thioindigo, iminoisoindolinone and iminoisoindoline, quinophthalone, quinacridone or metal complex pigments, for example of methine or azomethine dyes, as well as mixtures of different pigments.

Suitable colorants which are soluble in the polymer melt are those which are soluble in a polyamide, polyester, polycarbonate or polyolefin melt and which belong to the most varied chemical classes. Examples of such colourants are certain metal complexes of azo dyes, especially 1:2 metal complexes of monoazo dyes, and amino- or acylaminoanthraquinones, phthalocyanines, quinacridones, 2,4-di-(2'-hydroxynaphthyl)-6-pyrenyl-1,3,5-triazine, and also individual vat dyes, such as perylenetetracarboxylic diimides or anthrimide carbazoles.

When the kneading procedure is complete, the colored and solidified melt is in the form of a moist, irregular broken granulate which can be easily discharged from the machine. The moist granulate is dried and comminuted. The granulate can be dried before or after it is comminuted. Suitable grinding machines are e.g. rotary cutters. The granular product obtained can be used e.g. direct as colorant preparation. If desired, it is ground to powder in e.g. a transverse current mill. It is also possible, however, to remelt the products to cylindrical or rectangular granulates.

Depending on the choice of the carrier material, the preparation is suitable for the mass coloration of material of high molecular weight, e.g. for paints, printing inks, filaments, plastics materials with or without solvents. They are particularly advantageous, however, for pigmenting thermoplastics in the form of filaments, sheets, injection moulding materials or profiles, for example made from polyolefins, such as polyethylene or polypropylene, polyvinyl chloride, ABS, polystyrene. The preparations can be used as obtained for pigmenting these materials. However, they are also most suitable for obtaining masterbatches, for example while simultaneously reducing the concentration of colorant using an internal kneader or continuous kneader, by which means it is also possible to obtain shading mixtures.

The invention is illustrated by the following Examples, in which the parts are by weight.

EXAMPLE 1

325 Parts of an aqueous paste containing 78 parts of C.I. Pigment Red 144 together with 52 parts of a vinyl acetate-modified polyethylene having a MFI value of 425 g/10 min. (e.g. Ultrathene UE 649-04, softening point 80° C.; manufactured by U.S.I.) are subjected to a flush process in a laboratory trough kneader at 110° C. When the flush process is complete, the melt is comminuted, while cooling, in the kneader in the presence of the pigment-free water and with the kneader in operation. The moist, irregular broken granulate (diameter about $\leq 1$ cm) is discharged and ground in a rotary cutter to a fine granulate (diameter about $\leq 4$ mm). The product is dried, affording a red preparation which contains 60% of pigment and which is suitable for the easy production of pigment concentrates, e.g. for polyester, polypropylene or polystyrene (masterbaches) with an internal kneader or a continuous kneader.

EXAMPLE 2

360 Parts of an aqueous paste containing 120 parts of C.I. Pigment Blue 15:3 together with 180 parts of a vinyl acetate-modified polyethylene having a MFI value of 150 g/10 min. (e.g. Elvax 420, softening point 88° C.; manufactured by DuPont) are subjected to a flush process in a laboratory trough kneader at 110° C. When the flush process is complete, the melt is comminuted, while cooling, in the kneader in the presence of the pigment-free water and with the kneader in operation. The moist, irregular broken granulate (diameter about $\leq 1$ cm) is discharged and ground in a rotary cutter to a fine granulate (diameter about $\leq 4$ mm). The product is dried, affording a blue preparation which contains 40% of pigment and which is suitable for direct coloration by blending it with the colorless thermoplastic, e.g. PE, PP, PS, PVC, PA-6.

EXAMPLE 3

227 Parts of an aqueous paste containing 65 parts of C.I. Pigment Red 48:2 together with 65 parts of a vinyl acetate-modified polyethylene having a MFI value of 150 g/10 min. (e.g. Elvax 420, softening point 88° C.; manufactured by DuPont) are subjected to a flush process in a laboratory trough kneader at 110° C. When the flush process is complete, the melt is comminuted, while cooling, in the kneader in the presence of the pigment-free water and with the kneader in operation. The moist, irregular broken granulate (diameter about $\leq 1$ cm) is discharged and ground in a rotary cutter to a fine granulate (diameter about $\leq 4$ mm). The product is dried, affording a red preparation which contains 50% of pigment and which is suitable for direct coloration by blending it with the colorless thermoplastic, e.g. PE, PP, PS, PVC.

EXAMPLE 4

78 Parts of a vinyl acetate-modified polyethylene having a MFI value of 150 g/10 min. (e.g. Elvax 420; DuPont) are fused at 110° C. in a laboratory trough kneader. To the melt are added uniformly 52 parts of C.I. Pigment Black 7 and after ¼ hour 30 parts of water are added. During the subsequent cooling, the melt is comminuted in the kneader while this latter is in operation. The moist, irregular granulate (diameter about $\leq 1$ cm) is discharged and ground in a rotary cutter to a fine granulate (diameter about $\leq 4$ mm). The product is dried, affording a black preparation which contains 40% of pigment and which is suitable for direct coloration by blending it with the colorless thermoplastic, e.g. PE, PS, PVC, PA-6.

EXAMPLE 5

The procedure of Example 4 is repeated using C.I. Pigment Red 108 instead of C.I. Pigment Black 7, affording an equally good preparation which is suitable for colouring PE, PP, PVC and ABS.

EXAMPLE 6

39 Parts of a vinyl acetate-modified polyethylene having a MFI value of 500 g/10 min. (e.g. Elvax 420; DuPont) are fused at 110° C. in a laboratory trough kneader. To the melt are added uniformly 91 parts of C.I. Pigment Red 101 and after ¼ hour 30 parts of water are added. During the subsequent cooling, the melt is comminuted in the kneader while this latter is in operation. The moist, irregular granulate (diameter about ≦1 cm) is discharged and ground in a rotary cutter to a fine granulate (diameter about ≦4 mm). The product is dried, affording a brown preparation which contains 70% of pigment and which is suitable for direct coloration by blending it with the colorless thermoplastic, e.g. PE, PP, PS, PVC.

EXAMPLE 7

236 Parts of an aqueous paste containing 52 parts of C.I. Pigment Yellow 93 together with 39 parts of a vinyl acetate-modified polyethylene having a MFI value of 150 g/10 min. (e.g. Elvax; DuPont) and 39 parts of polyethylene wax (e.g. AL-61 Wax; BASF) are subjected to a flush process in a laboratory trough kneader at 110° C. When the flush process is complete, the melt is comminuted, while cooling, in the kneader in the presence of the pigment-free separated water and with the kneader in operation. The fairly fine granulate (diameter about ≦5 mm) is discharged and dried, affording a yellow preparation which contains 40% of pigment and which is suitable for direct coloration by blending it with the colorless thermoplastic, e.g. PE, PP, PS, PVC.

EXAMPLE 8

235 Parts of an aqueous paste containing 65 parts of C.I. Pigment Red 166 together with 45.5 parts of magnesium behenate and 19.5 parts of a vinyl acetate-modified polyethylene having a MFI value of 150 g/10 min. (e.g. Elvax 420; DuPont) are subjected to a flush process in a laboratory trough kneader at 110° C. when the flush process is complete, the melt is comminuted, while cooling, in the kneader in the presence of the pigment-free separated water and with the kneader in operation. The fairly fine granulate (diameter about ≦5 mm) is discharged and dried, affording a red preparation which contains 50% of pigment and which is suitable for direct coloration by blending it with the colorless thermoplastic, e.g. PE, PP, PS, PVC.

EXAMPLE 9

249 Parts of an aqueous paste containing 78 parts of C.I. Pigment Blue 15:3 together with 52 parts of a permanent plasticiser (Elvaloy 741, polymer plasticiser based on an ethylene/vinyl acetate copolymer, softening point 83° C.; DuPont) are subjected to a flush process in a laboratory kneader at 125° C. When the flush process is complete, the melt is comminuted, while cooling, in the kneader in the presence of the separated pigment-free water and with the addition of ice. The irregular broken granulate is dried in a vacuum cabinet at 40°-50° C. and then ground to fine granules with dry ice in a transverse current mill, affording a blue preparation which contains 40% of pigment and which is most suitable for pigmenting PVC.

EXAMPLE 10

254 Parts of an aqueous paste containing 78 parts of C.I. Pigment Red 2 together with 52 parts of an acid polyacrylic resin having an acid number of 75 are subjected to a flush process in a laboratory trough kneader at 110° C. When the flush process is complete, the melt is cooled to 70° C. and the water, which has separated off clearly, is decanted. The melt is comminuted, while cooling, in the kneader in the presence of 200 parts of ice and with the kneader in operation. The resulting irregular granules are subjected to a wet grinding in a gear colloid mill with about 2000 parts of water for fine granulation. The granules are filtered and the filter cake is dried in a vacuum cabinet at 60° C. The dried material is advantageously pressed through a sieve of 0.5 mm mesh width. A red preparation with a pigment content of 50% is obtained, which disperses perfectly in printing inks and gives, for example on paper and aluminium foil, glossy prints which are intensely colored.

EXAMPLES 11-17

The flush process of the invention can be carried out just as easily and advantageously using e.g. the following carriers instead of those employed in Examples 1-10.

11. a polyethylene (e.g. HC-Polyethylene 7A, softening point 90° C.; 612A, softening point 90° C.; 617A, softening point 82° C.; Allied Chemical)
12. an oxazoline wax (e.g. Oxazoline Wax ES 254, softening point 72° C.; Commercial Solvent Corporation)
13. a polyamide (e.g. Vestamid T 350A/P1, softening point 82° C.; Chemische Werke Hüls)
14. a sulfonamide resin (e.g. Demidal 70, softening point 70° C.; Vereinigte Chemische Fabriken Kreidl, Rütter + Co.)
15. a solid plasticiser (e.g. Benzoflex S 432, softening point 80° C.; or Benzoflex S 552, softening point 98° C.; Velsicol Chem. Corp.)
16. a polycaprolactone (e.g. PCL 700, softening point 70° C.; Union Carbide)
17. a paraffin-like product (e.g. Sasol Wax H1, softening point 84° C., $C_{11}H_{24}$; VEBA Chemie).

Preparations with good properties for the different application media are obtained.

What is claimed is:

1. In an improved flush process for the production of a colorant composition, which contains, by weight of the total composition, 10 to 90% of a water-insoluble colorant and 90 to 10% of a water-repellent organic carrier material, which involves mixing a colorant in the presence of water with the organic carrier material, which material has a softening point between 60° and 100° C., in a kneader at a temperature sufficient to melt said organic carrier material and flushing the colorant into the organic carrier material with the concomitant formation of a colorant-free separate water phase, wherein the improvement consists essentially of
   (a) mixing the organic carrier material with an aqueous colorant paste or with a dry colorant and water, in a kneader and heating the kneader to a temperature sufficient to melt said organic carrier material, or
   adding the organic carrier material, at room temperature, to a kneader preheated to a temperature sufficient to melt said organic carrier material and then adding dry colorant and water or an aqueous colorant paste to the now molten organic carrier material in the heated kneader,
   (b) kneading the mixture of colorant, water and molten organic carrier material to flush the colorant into the molten organic carrier material to form a molten colorant composition with the concomitant formation of a colorant-free separate water phase,
   (c) now cooling the kneader, while continuing kneading, to a temperature below the softening point of the organic carrier, a temperature sufficient to cause the molten colorant composition to solidify, and concomitantly (d) comminuting the solidified colorant composition into broken irregular granulates in the presence of the colorant-free separate water phase.

2. A process according to claim 1, wherein the colorant is a pigment.

3. A process according to claim 1, wherein the water-repellant organic carrier material is a thermoplastic resin.

4. A process according to claim 3, wherein the thermoplastic resin is a polyacrylic resin.

5. A process according to claim 3, wherein the thermoplastic resin is a hydrocarbon resin.

6. A process according to claim 3, wherein the thermoplastic resin is an ethylene/vinyl acetate copolymer.

7. A process according to claim 6, wherein the ethylene/vinyl acetate copolymer contains 5 to 30% by weight vinyl acetate.

8. A process according to claim 6, wherein a polyolefin wax, a metal soap or mixture thereof are also present with the ethlylene/vinyl acetate copolymer.

9. A colorant composition produced by the process of claim 1.

* * * * *